United States Patent
Locker et al.

(10) Patent No.: US 8,595,012 B2
(45) Date of Patent: Nov. 26, 2013

(54) SYSTEMS AND METHODS FOR INPUT DEVICE AUDIO FEEDBACK

(75) Inventors: Howard Locker, Cary, NC (US); Harriss Christopher Neil Ganey, Cary, NC (US); Jay W. Johnson, Raleigh, NC (US); Aaron M. Stewart, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 240 days.

(21) Appl. No.: 12/826,086

(22) Filed: Jun. 29, 2010

(65) Prior Publication Data

US 2011/0320204 A1 Dec. 29, 2011

(51) Int. Cl.
*G10L 13/08* (2013.01)
*G09G 5/00* (2006.01)
*G06F 3/033* (2013.01)

(52) U.S. Cl.
USPC .......................... 704/260; 345/156; 345/157

(58) Field of Classification Search
USPC ....................................................... 704/260
See application file for complete search history.

(56) References Cited

U.S. PATENT DOCUMENTS

| | | | | |
|---|---|---|---|---|
| 5,537,141 A * | 7/1996 | Harper et al. | ................. | 725/116 |
| 5,566,678 A * | 10/1996 | Cadwell | ......................... | 600/544 |
| 5,627,348 A * | 5/1997 | Berkson et al. | ............ | 178/19.04 |
| 5,767,457 A * | 6/1998 | Gerpheide et al. | ......... | 178/18.03 |
| 6,710,267 B2 * | 3/2004 | Natsuyama et al. | ....... | 178/19.04 |
| 6,738,050 B2 * | 5/2004 | Comiskey et al. | ............ | 345/173 |
| 6,771,254 B2 * | 8/2004 | An et al. | ........................ | 345/173 |
| 6,853,868 B1 * | 2/2005 | Albers et al. | .................... | 700/94 |
| 7,265,750 B2 * | 9/2007 | Rosenberg | ..................... | 345/182 |
| 7,627,703 B2 * | 12/2009 | Oliver | ............................. | 710/72 |
| 8,243,033 B2 * | 8/2012 | Ely et al. | ........................ | 345/173 |
| 2003/0067450 A1 * | 4/2003 | Thursfield et al. | ............ | 345/173 |
| 2005/0266386 A1 * | 12/2005 | Marggraff et al. | ............ | 434/317 |
| 2007/0005849 A1 * | 1/2007 | Oliver | ............................. | 710/72 |
| 2007/0276525 A1 * | 11/2007 | Zadesky et al. | ................. | 700/94 |
| 2008/0027726 A1 * | 1/2008 | Hansen et al. | ................. | 704/260 |
| 2008/0173717 A1 * | 7/2008 | Antebi et al. | .................. | 235/439 |
| 2009/0015567 A1 * | 1/2009 | Abdelbaki et al. | ............ | 345/179 |
| 2009/0135139 A1 * | 5/2009 | Wong et al. | ..................... | 345/157 |
| 2009/0309849 A1 * | 12/2009 | Iwema et al. | ................. | 345/173 |
| 2010/0063818 A1 * | 3/2010 | Mason et al. | ................. | 704/251 |
| 2011/0102349 A1 * | 5/2011 | Harris | ............................ | 345/173 |
| 2011/0201387 A1 * | 8/2011 | Paek et al. | ...................... | 455/566 |
| 2011/0234488 A1 * | 9/2011 | Ge et al. | ......................... | 345/156 |
| 2011/0267182 A1 * | 11/2011 | Westerinen et al. | ........ | 340/407.2 |
| 2011/0285639 A1 * | 11/2011 | Harris et al. | ................... | 345/173 |
| 2011/0320204 A1 * | 12/2011 | Locker et al. | ................. | 704/260 |
| 2012/0127088 A1 * | 5/2012 | Pance et al. | .................... | 345/173 |

OTHER PUBLICATIONS

Muller-Tomfelde, Christian, and Steiner, Sascha, "Audio-Enhanced Collaboration at an Interactive Electronic Whiteboard", Proceedings of the 2001 International Conference on Auditory Display, Espoo, Finland, Jul. 29-Aug. 1, 2001.

* cited by examiner

*Primary Examiner* — David R Hudspeth
*Assistant Examiner* — Timothy Nguyen
(74) *Attorney, Agent, or Firm* — Ference & Associates LLC

(57) ABSTRACT

Systems, methods, apparatuses and computer program products configured to provide sound feedback for input devices are described. Embodiments take input from a digitizer, such as input using as stylus/pen, and produce sound feedback to enhance the user's input interface experience. Embodiments thus provide a user with a more realistic interface with an electronic device, emulating use of conventional writing implements.

12 Claims, 4 Drawing Sheets

SYSTEMS AND METHODS FOR INPUT DEVICE AUDIO FEEDBACK

BACKGROUND

The subject matter described herein generally relates to user interfaces for electronic devices.

Tablet computers, for example a ThinkPad® X41 tablet computer, slate computers, personal digital assistants, smart phones, and other electronic devices permit users to provide input using a digitizer pen, stylus or the like. For example, a tablet digitizer pen can be used to control a computer as with a mouse or keyboard. Besides functioning as a basic selection tool, the tablet digitizer pen allows writing (text, drawings, et cetera) on the screen, as with a pen on a piece of paper, for example to jot down notes and illustrations and store them digitally. Different ways of providing input using the table digitizer pen can be chosen from a control panel. ThinkPad® is a registered mark of Lenovo (Singapore) Pte. Ltd. in the United States and other countries.

A digitizer is an input device that allows writing digital input with the digitizer pen/stylus. The digitizer is used to capture data input with the stylus. Some digitizers visually display the writing input in near real-time, thus functioning as a secondary computer screen that can be interacted with directly using the stylus.

BRIEF SUMMARY

One aspect provides an apparatus comprising: one or more input devices, the one or more input devices including a digitizer configured to receive inputs via a stylus; and one or more processors; wherein, responsive to execution of computer readable program code accessible to the one or more processors, the one or more processors are configured to: ascertain one or more inputs to the digitizer; map the one or more inputs to predetermined audio data; and output the predetermined audio data to an audio sub-system responsive to the one or more inputs; wherein the predetermined audio data comprises audio data for emulating a predetermined writing implement pair.

Another aspect provides a computer program product comprising: a computer readable storage medium having computer readable program code embodied therewith, the computer readable program code comprising: computer readable program code configured to ascertain one or more inputs to a digitizer input via a stylus; computer readable program code configured to map the one or more inputs to predetermined audio data; and computer readable program code configured to output the predetermined audio data to an audio sub-system responsive to the one or more inputs; wherein the predetermined audio data comprises audio data for emulating a predetermined writing implement pair.

A further aspect provides a method comprising: ascertaining one or more inputs to a digitizer; mapping the one or more inputs to predetermined audio data; and outputting the predetermined audio data to an audio sub-system responsive to the one or more inputs; wherein the predetermined audio data comprises audio data for emulating a predetermined writing implement pair.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
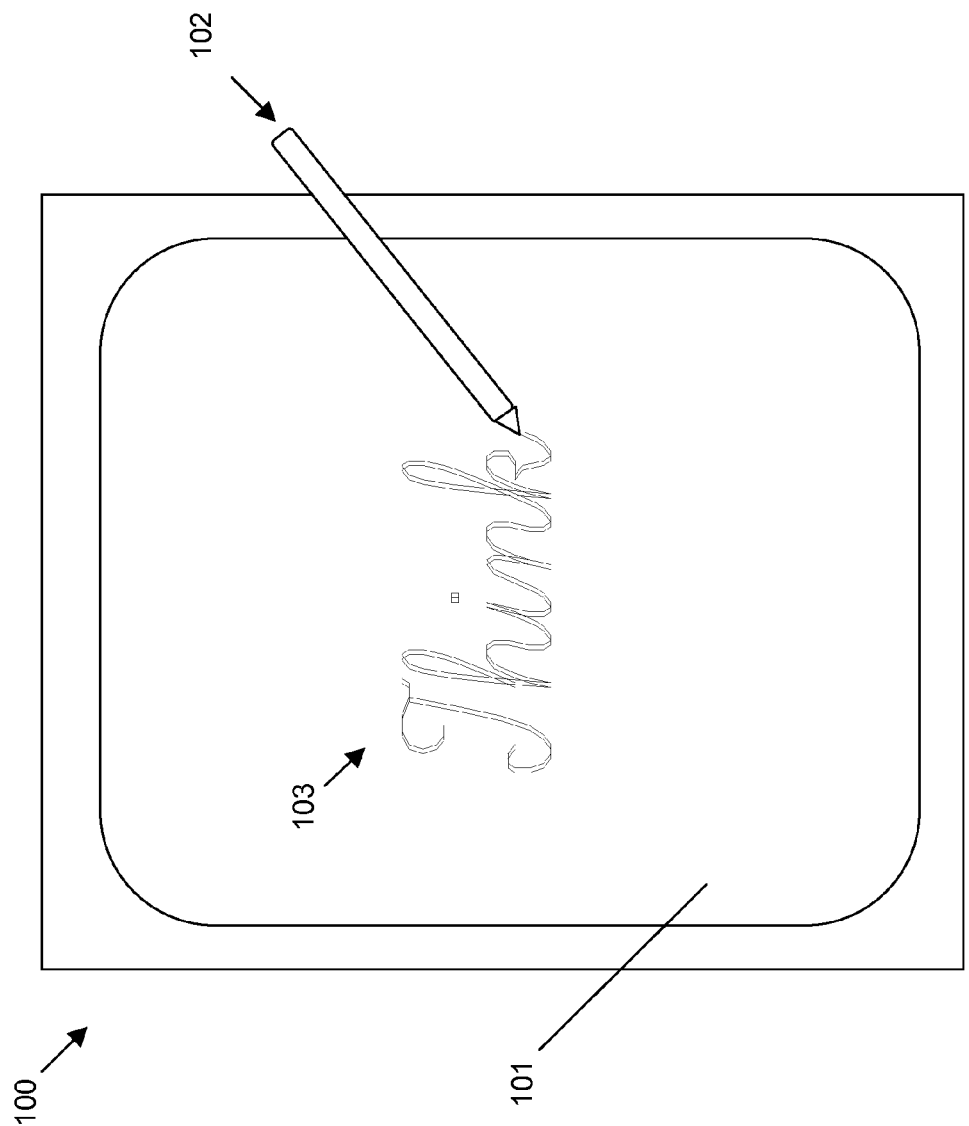
FIG. 1 illustrates an example electronic device with a pen/stylus and digitizer user input interface.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

In this regard, interfacing with a particular example electronic device (tablet personal computer (PC)), via a particular interface (pen/stylus and digitizer), is used herein as a non-limiting example to highlight important aspects. However, it will be readily understood that the methods, systems, computer program products, and apparatuses described in detail herein simply represent example implementations and use contexts, and that the embodiments are equally applicable to other implementations and use contexts.

At the outset, it should be noted that herein the following terms have the following meaning. Audio data, sound/audio feedback, and the like take the meaning of data that when provided to a suitable audio subsystem (for example to a speaker of an electronic device) is capable of producing sound of the described character. Digitizer takes the meaning of an input device configured to receive inputs via a pen, a stylus or the like. A pen, a stylus, or the like takes the meaning of an input device capable of interfacing with a digitizer. A writing implement pair takes the meaning of a conventional (non/electronic, non-digital) writing implement such as a pen, a pencil, a marker, a piece of chalk or the like, as well as a conventional writing implement's object, for example a piece of paper, a whiteboard, a chalk board and the like.

The inventors have recognized that interfacing (for example, writing) with a plastic pen/stylus on a slate or tablet screen (digitizer) does not have the same experience as writing with a pen on paper, a marker on a whiteboard, a piece of chalk on a chalkboard, or the like. The feedback (sound, feel, et cetera) is different and not as satisfying to the end user. The lack of good feedback also introduces lower accuracy.

Accordingly, embodiments provide sound feedback to enhance the user's experience. The sound feedback provided is configurable, as for example through user selection and/or by the system ascertaining differences in inputs, and thus can vary depending on how the pen is used. This variation will give the user audible feedback and enhance the overall experience.

Conventional systems simply display visual results and/or rely on operating system (OS) generated sounds designed for mouse input, requiring the user to look at the screen for visual feedback and lacking feedback that emulates actual use of a writing implement pair (for example, use of a pen on a piece of paper). Accordingly, embodiments use captured sounds of actual writing implements (for example, markers/pens/pencils/chalk) writing on objects (for example, whiteboards/paper/chalkboards) to provide predetermined audio data for emulating the same.

Throughout, it should be appreciated that user selection for desired sound and/or volume level is provided, as for example through a sound settings application. Sound settings for the stylus/digitizer audio feedback can be added to existing setting controls (for example, within OS Control Panel). A user can set volume level for stylus writing/erase sounds as desired. Optionally, the system can automatically adjust the sound level for the audio feedback, for example by ascertaining ambient sound levels through the computer's microphone and automatically determining volume level for the writing/erase sounds.

The illustrated example embodiments will be best understood by reference to the figures. The following description is intended only by way of example, and simply illustrates certain example embodiments.

FIG. 1 illustrates an example electronic device with a stylus/digitizer-input device. The example electronic device 100 illustrated and described is a tablet PC, though this is by no means limiting. The device 100 includes a digitizer 101 that is configured to accept input from a stylus 102. The user can utilize the stylus to provide inputs, such as writing 103, that mimic conventional writing implement pairs (for example, pen and paper) in digital form. Using the stylus 102 and digitizer 101, the user can thus jot down notes or create drawings, which are digitized and can be stored within a memory of the device 100.

Figure 2:
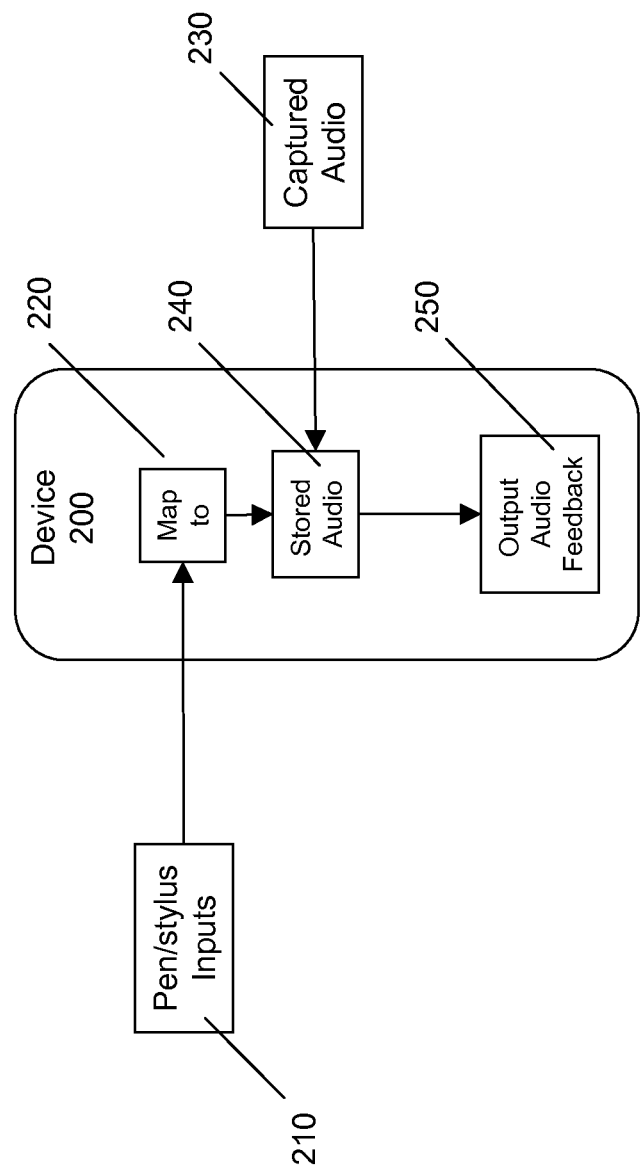
FIG. 2 illustrates an example audio mapping and output method.

FIG. 2 illustrates an example audio mapping and output method. Embodiments add to the stylus/digitizer visual feedback via leveraging a store of predetermined audio to emulate a conventional writing implement pair, such as a pen and paper. Thus, as pen/stylus inputs 210 are provided to the device 200 by the user, the device maps 220 these inputs to stored audio 240. The stored audio 240 corresponds to audio of a writing implement pair of choice (for example, pen and paper). The mapping 220 matches a particular type of input 210 to a particular type of stored audio 240. For example, the mapping 220 can include mapping a user selection (such as a particular width of pen used for input) to a predetermined/stored audio type (marker audio for larger width, pen audio for smaller width).

The stored audio 240 can be derived in a variety of ways, for example via recording (capturing) of audio during actual use of the writing implement pair(s) in a quiet environment. Responsive to the pen/stylus inputs 210, output audio feedback 250 is provided, for example providing audio data to a sound sub-system of the device 200 (refer to FIG. 4) such that sound is produced emulating a particular writing implement pair.

Figure 3:
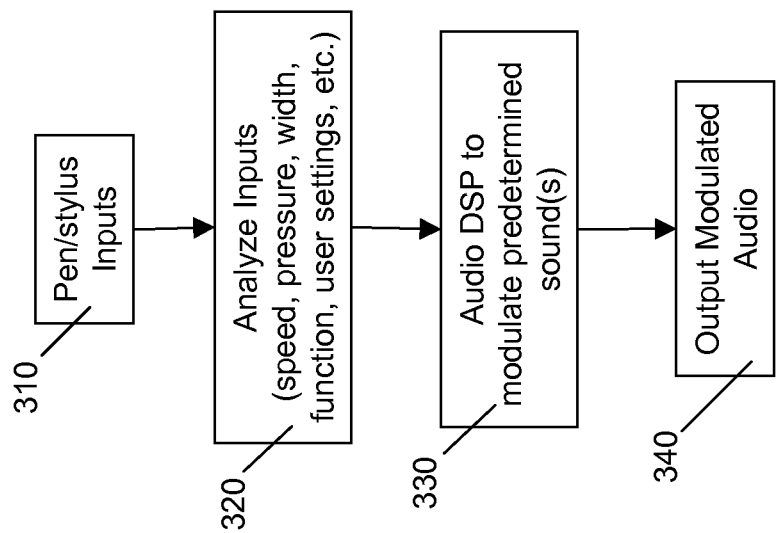
FIG. 3 illustrates an example audio analysis and output method.

FIG. 3 illustrates an example audio analysis and output method. As pen/stylus inputs 310 are ascertained by the device, these inputs are analyzed 320 to identify characteristic(s) useful in mapping the inputs to predetermined audio data. Once the inputs have been analyzed 320, appropriate audio digital signal processing (DSL) can be done 330 to produce appropriate sound feedback for output 340.

An example way of accomplishing analysis 320 and audio DSP 330 to provide appropriate sound feedback 340 is use of pen/stylus input software to determine 320 speed of input, pressure of input, width of input, et cetera, as sensed through the digitizer. Then, audio DSP 330 is used to modify the stored audio data to provide sound feedback emulating how the stylus/digitizer pair would sound if these actions were actually provided by a writing implement pair (such as a real pen used on real paper). It should be noted that any desired sounds could be emulated, such as erase sounds for the eraser function of a pen or pencil. The system can analyze 320 and ascertain characteristics of the input via an input device and supporting instructions, as in the following: speed of input sensed via a digitizer and device driver; pressure of input sensed by a digitizer and device driver; and width of input sensed by a digitizer and device driver. A user may select the desired sound type, as for example from a sound settings menu listing pencil on paper; pen on paper; marker on whiteboard; and the like, or the system may automatically select the sound type based on the input, as described herein.

Different stylus (for example, pen) use modes (as determined by the input) will produce different modifications to the sound feedback. This can take any of a variety of forms. For example, the larger the width of the pen selected, the louder (larger amplitude, amplification factor) the sound feedback provided. As another example, the frequency of the sound feedback provided will increase as the pen moves faster. The sound feedback will stop when the pen stops. As another example, the more pressure applied, the louder the sound feedback provided.

The functionality described above can be implemented for example by providing instructions to one or more processors. The one or more processors may form, along with the instructions, a dedicated sub-system or may be a general-purpose processor of the device, which accesses the necessary instructions and/or inputs from a device driver. Thus, it will be understood by those having ordinary skill in the art that the embodiments can be implemented with electronic devices having appropriately configured circuitry, such as tablet computer systems, smart phones, and the like. A non-limiting example of a computer system is described below.

The term "circuit" or "circuitry" as used herein includes all levels of available integration, for example, from discrete logic circuits to the highest level of circuit integration such as VLSI, and includes programmable logic components programmed to perform the functions of an embodiment as well as general-purpose or special-purpose processors programmed with instructions to perform those functions.

Figure 4:
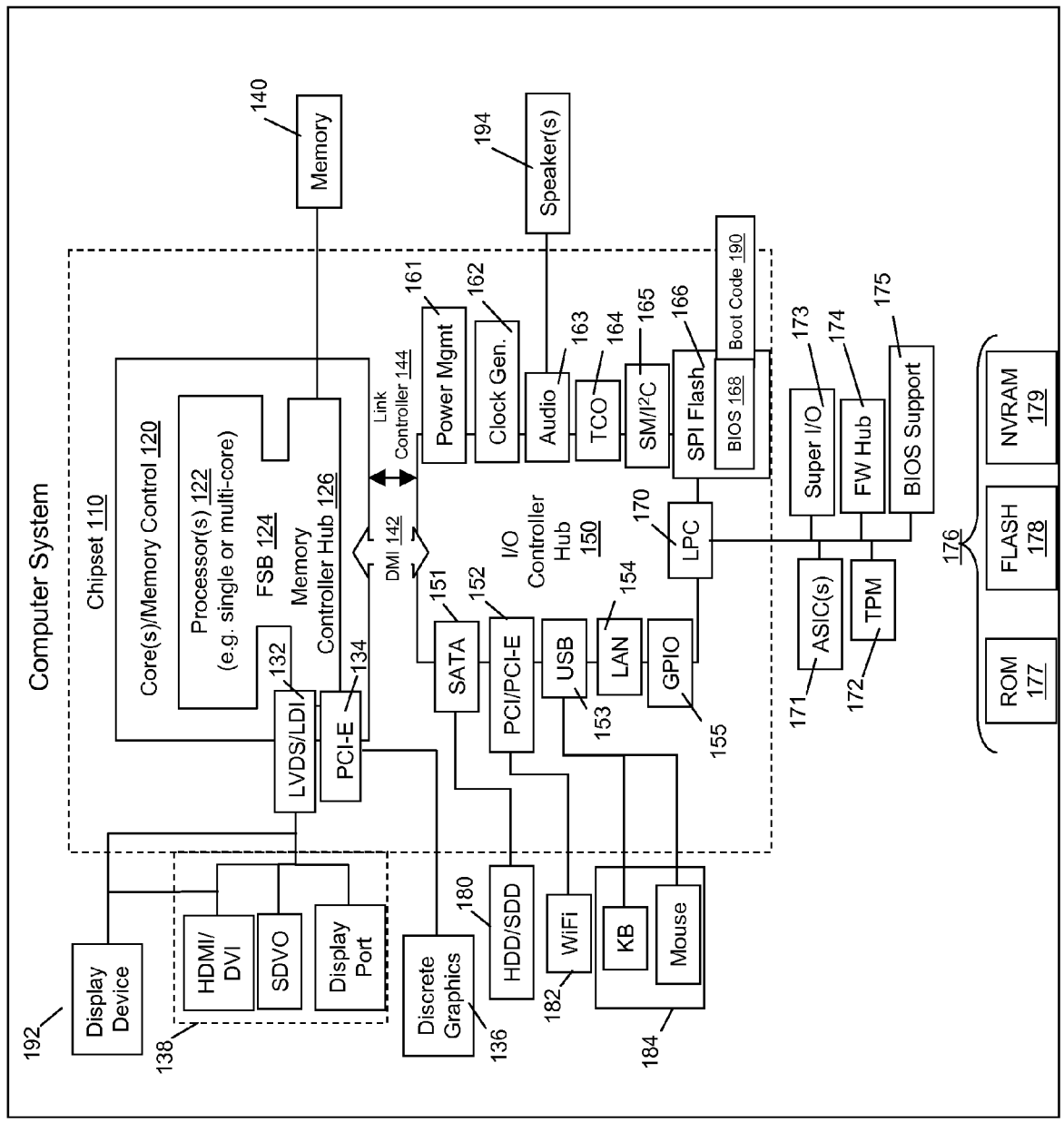
FIG. 4 illustrates an example computer system.

While various other circuits or circuitry may be utilized, FIG. 4 depicts a block diagram of one example of a computer system and circuitry. The system may be a tablet computer system, such as one of the ThinkPad® series of personal computers sold by Lenovo (US) Inc. of Morrisville, N.C.; however, as apparent from the description herein, a client device or other machine may include other features or only some of the features of the system illustrated in FIG. 4.

The computer system of FIG. 4 includes a so-called chipset 110 (a group of integrated circuits, or chips, that work together, chipsets) with an architecture that may vary depending on manufacturer (for example, INTEL®, AMD®, etc.). The architecture of the chipset 110 includes a core and memory control group 120 and an I/O controller hub 150 that exchange information (for example, data, signals, commands, et cetera) via a direct management interface (DMI) 142 or a link controller 144. In FIG. 4, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 4, the memory controller hub 126 interfaces with memory 140 (for example, to provide support for a type of RAM that may be referred to as "system memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 4, the I/O hub controller 150 includes a SATA interface 151 (for example, for HDDs, SDDs, et cetera), a PCI-E interface 152 (for example, for wireless connections 182), a USB interface 153 (for example, for input devices 184 such as a digitizer, keyboard, mice, cameras, phones, storage, et cetera.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 4.

Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations may be written in any combination of one or more programming languages (including an object oriented programming language such as Java™, Smalltalk, C++ or the like and conventional procedural programming languages, such as the "C" programming language or similar programming languages). The user's computer may connect to other devices through any type of network, including a local area network (LAN) or a wide area network (WAN), or the connection may be made to an external computer (for example, through the Internet using an Internet Service Provider).

Embodiments are described herein with reference to flowchart illustrations and/or block diagrams. It will be understood that blocks of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the illustrations.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the illustrations.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the illustrations.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

What is claimed is:

1. an apparatus comprising:
   one or more input devices, the one or more input devices including a digitizer configured to receive inputs via a stylus; and
   one or more processors;
   wherein, responsive to execution of computer readable program code accessible to the one or more processors, the one or more processors are configured to:
   ascertain one or more inputs to the digitizer;
   map one or more writing input characteristics selected from the group of characteristics consisting of a speed of the one or more inputs, a pressure of the one or more inputs, and a width of the one or more inputs that are indicative of a predetermined writing implement pair to select predetermined audio data of the predetermined writing implement pair;
   wherein mapping one or more inputs having an increasing speed to audio data having an increasing frequency adaptively response to the speed of the one or more inputs; mapping one or more inputs having a particular width to audio data having a predetermined amplification factor corresponding to the particular width of the one or more inputs; mapping one or more inputs having a particular pressure to audio data having a predetermined amplification factor corresponding to the particular pressure of the one or more inputs; and
   output the predetermined audio data to an audio sub-system responsive to mapping of the one or more inputs.

2. The apparatus according to claim 1, wherein the predetermined audio data comprises captured audio data of one or more writing implement pairs.

3. The apparatus according to claim 2, wherein the one or more writing implement pairs comprises a writing implement pair selected from the group consisting of a pen and a piece of paper, a pencil and a piece of paper, a marker and a whiteboard, and a piece of chalk and a chalkboard.

4. The apparatus according to claim 1, wherein to map the one or more inputs to predetermined audio data further comprises using audio digital signal processing of the predetermined audio data to emulate a predetermined writing implement pair.

5. The apparatus according to claim 4, further comprising:
   a storage device storing audio data corresponding to a plurality of predetermined writing implement pairs;
   wherein the one or more processors are further configured to present an application window for user selection of a predetermined writing implement pair from the plurality of predetermined writing implement pairs.

6. A computer program product comprising:
   a computer readable storage medium having computer readable program code embodied therewith, the computer readable program code comprising:
   computer readable program code configured to ascertain one or more inputs to a digitizer input via a stylus;
   computer readable program code configured to map one or more writing input characteristics selected from the group of characteristics consisting of a speed of the one or more inputs, a pressure of the one or more inputs, and a width of the one or more inputs that are indicative of a predetermined writing implement pair to select predetermined audio data of the predetermined writing implement pair;
   wherein mapping one or more inputs having an increasing speed to audio data having an increasing frequency adaptively response to the speed of the one or more inputs; mapping one or more inputs having a particular width to audio data having a predetermined amplification factor corresponding to the particular width of the one or more inputs; mapping one or more inputs having a particular pressure to audio data having a predetermined amplification factor corresponding to the particular pressure of the one or more inputs; and
   computer readable program code configured to output the predetermined audio data to an audio sub-system responsive to the one or more inputs;
   wherein the predetermined audio data comprises audio data for emulating the predetermined writing implement pair.

7. The computer program product according to claim 6, wherein the predetermined audio data comprises captured audio data of one or more writing implement pairs.

8. The computer program product according to claim 7, wherein the one or more writing implement pairs comprises a writing implement pair selected from the group consisting of a pen and a piece of paper, a pencil and a piece of paper, a marker and a whiteboard, and a piece of chalk and a chalkboard.

9. The computer program product according to claim 6, wherein the computer readable program code configured to output the predetermined audio data to an audio sub-system responsive to the one or more inputs further comprises computer readable program code configured to use audio digital signal processing of the predetermined audio data to emulate a predetermined writing implement pair.

10. The computer program product according to claim 9, further comprising:
    computer readable program code configured to access a storage device storing audio data corresponding to a plurality of predetermined writing implement pairs; and
    computer readable program code configured to present an application window for user selection of a predetermined writing implement pair from the plurality of predetermined writing implement pairs.

11. A method comprising:
    ascertaining one or more inputs to a digitizer;
    mapping one or more writing input characteristics selected from the group of characteristics consisting of a speed of the one or more inputs, a pressure of the one or more inputs, and a width of the one or more inputs of the one or more inputs that are indicative of a predetermined writing implement pair to select predetermined audio data of the predetermined writing implement pair;
    wherein mapping one or more inputs having an increasing speed to audio data having an increasing frequency adaptively response to the speed of the one or more inputs; mapping one or more inputs having a particular width to audio data having a predetermined amplification factor corresponding to the particular width of the one or more inputs; mapping one or more inputs having a particular pressure to audio data having a predetermined amplification factor corresponding to the particular pressure of the one or more inputs; and
    outputting the predetermined audio data to an audio sub-system responsive to the one or more inputs;
    wherein the predetermined audio data comprises audio data for emulating the predetermined writing implement pair.

12. The method according to claim 11, wherein outputting the predetermined audio data to an audio sub-system responsive to the one or more inputs further comprises using audio digital signal processing of the predetermined audio data to emulate a predetermined writing implement pair.

\* \* \* \* \*